US007911371B2

(12) United States Patent
Karam

(10) Patent No.: US 7,911,371 B2
(45) Date of Patent: Mar. 22, 2011

(54) EXTRACTION OF RELATIVE SIGNALS FROM CLOSELY SPACED TARGETS IN A MONOPULSE SYSTEM

(75) Inventor: Mostafa Karam, Moorpark, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 87 days.

(21) Appl. No.: 12/393,656

(22) Filed: Feb. 26, 2009

(65) Prior Publication Data

US 2010/0214156 A1 Aug. 26, 2010

(51) Int. Cl.
*G01S 13/00* (2006.01)
(52) U.S. Cl. .......... 342/25 C; 342/80; 342/149; 342/427
(58) Field of Classification Search ............ 342/25
See application file for complete search history.

(56) References Cited

U.S. PATENT DOCUMENTS

| 4,646,095 | A | | 2/1987 | Kanter |
|---|---|---|---|---|
| 5,638,281 | A | * | 6/1997 | Wang ............................ 701/301 |
| 5,847,673 | A | | 12/1998 | DeBell |
| 6,144,333 | A | | 11/2000 | Cho |
| 6,801,156 | B1 | | 10/2004 | Wasiewicz |
| 7,250,902 | B2 | | 7/2007 | Manoogian et al. |
| 7,330,149 | B2 | | 2/2008 | Weatherford |
| 7,417,584 | B1 | | 8/2008 | Reifler et al. |

OTHER PUBLICATIONS

Karam: Application for patent being concurrently filed on Feb. 26, 2009, for "*Detection and Resolution of Closely Spaced Targets in a Monopulse System*".

* cited by examiner

*Primary Examiner* — Thomas H Tarcza
*Assistant Examiner* — Timothy A Brainard
(74) *Attorney, Agent, or Firm* — Tarolli, Sundheim, Covell & Tummino LLP

(57) ABSTRACT

Systems and methods are provided for extracting relative signal parameters representing two closely spaced targets from monopulse scan data. A maximum quadrature angle value from the scan data is compared with a threshold quadrature value representing a noise level. A linear polynomial model is utilized if the maximum quadrature angle exceeds the threshold value. The linear polynomial model fits a function of the azimuth angle values and quadrature angle values to a linear function of an exponential parameter derived from the boresight angles to produce polynomial coefficients and determines the relative signal parameters from the polynomial coefficients. A cubic polynomial model is utilized if the maximum quadrature angle fails to exceed the threshold value. The cubic polynomial model fits azimuth angle values to a cubic function of corresponding boresight angles to produce a set of polynomial coefficients and determines the relative signal parameters from the set of polynomial coefficients.

20 Claims, 6 Drawing Sheets

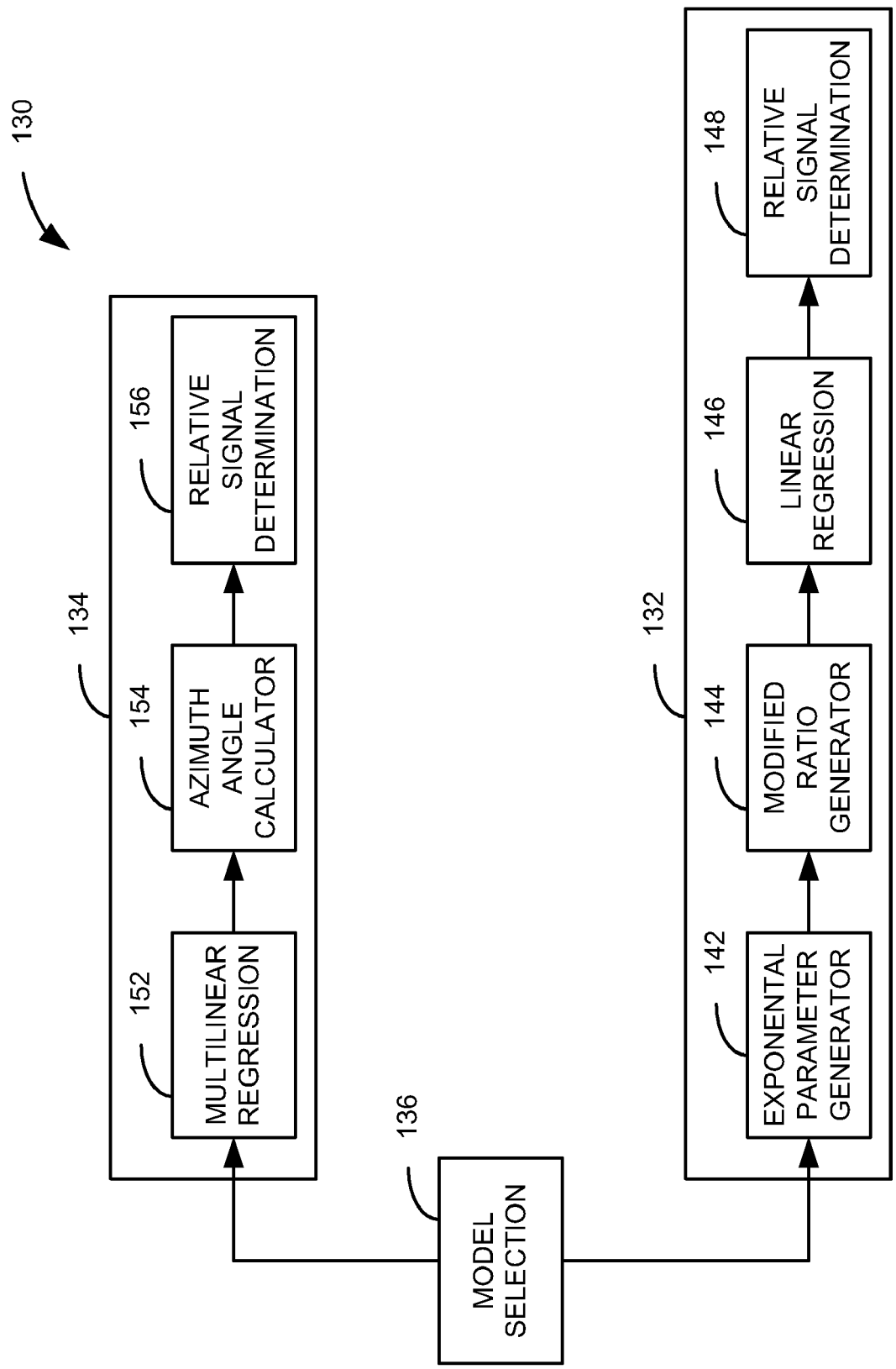

EXTRACTION OF RELATIVE SIGNALS FROM CLOSELY SPACED TARGETS IN A MONOPULSE SYSTEM

TECHNICAL FIELD

The present invention relates to imaging or tracking system and, more particularly, to systems and methods for extracting signals from closely spaced targets in a monopulse system.

BACKGROUND OF THE INVENTION

The problem of detecting and resolving plural targets located within a scan of a monopulse system draws interest from many radar and sonar applications such as target tracking, target recognition, surveillance, biomedical imagining, robotic vision, and similar applications. When two targets or more are scanned by a monopulse antenna or transducer, the angles of arrival of the targets are merged into one angle by the antenna. This merged angle of arrival is far from angles of arrival of all targets within the beam, which adds bias and wandering trends to measured targets' trajectories. The merged angle of arrival depends on a number of parameters such as the phase difference between targets' signals, the radar/sonar cross section ratio of the targets, and the angular separation between targets, which makes it difficult to extract any of these parameters from the merged data.

Most of existing techniques for detecting and resolving two closely spaced targets from standard monopulse data are limited in some fashion. One category of techniques developed for monopulse antennas with uniform radiation patterns and they require prior knowledge for some targets' parameters such as number of targets within the antenna scan, and radar cross section ratio of those targets. Another set of techniques rely on features of the signal that may not be available because they occur outside the antenna scan under consideration or are washed away due to either noise or quantization. A third set of techniques requires data not available in a standard monopulse system. The implementation of these techniques is generally not cost efficient and often requires additional hardware, raising the overall cost and complexity of the system.

SUMMARY OF THE INVENTION

In accordance with one aspect of the present invention, a method is provided for extracting at least one relative signal representing two closely spaced targets from monopulse scan data, with the monopulse data including a quadrature angle value and a merged azimuth angle value for each plurality of boresight angles. A maximum magnitude of quadrature angle value from the quadrature angle values associated with the plurality of boresight angles is compared with a threshold quadrature value representing a noise level of the monopulse scan data. At least one relative signal is extracted according to a cubic polynomial model if the maximum quadrature angle exceeds the threshold quadrature value. The cubic polynomial model is configured to fit the merged azimuth angle values to a cubic function of their corresponding boresight angles to produce a set of polynomial coefficients and determine the relative signals from the set of polynomial coefficients. At least one relative signal is extracted according to a linear polynomial model if the maximum quadrature angle fails to exceed the threshold quadrature value. The linear polynomial model is configured to fit a function of the merged azimuth angle data associated with each boresight angle and the quadrature angle value associated with the boresight angle to a linear function of an exponential parameter that is an exponential function of the boresight angle to produce a first order coefficient and a constant value and determine the relative signals from the first order coefficient and the constant value.

In accordance with another aspect of the present invention, a system is provided for extracting relative signals representing two closely spaced targets from monopulse scan data. The monopulse scan data includes a quadrature angle value and a merged azimuth angle value for each plurality of boresight angles. An exponential parameter generator is configured to calculate, for each antenna boresight angle, an exponential parameter that is an exponential function of the boresight angle. A modified ratio generator is configured to compute, for each boresight angle, a modified ratio value as a function of the merged azimuth angle data associated with the boresight angle and the quadrature angle value associated with the boresight angle. A linear regression component is configured to fit the modified ratio values for the plurality of boresight angles to a linear function of the exponential parameters for the plurality of boresight angles via a linear regression technique to provide a first order coefficient value and a constant value. A relative signal determination component is configured to calculate at least one relative signal parameter representing the two closely spaced targets as a function of the first order coefficient value and the constant value.

In accordance with yet another aspect of the present invention, a system is provided for extracting relative signals representing two closely spaced targets from monopulse scan data. The monopulse scan data includes a quadrature angle value and a merged azimuth angle value for each plurality of boresight angles. A multilinear regression element is configured to fit the merged azimuth angle values to a cubic function of their corresponding boresight angles to produce a set of polynomial coefficients. An azimuth angle calculator is configured to determine an azimuth difference as a difference between a first azimuth angle value for a first target and a second azimuth angle value for a second target and an azimuth mean as a mean of the first azimuth angle value and a second azimuth angle value from the set of polynomial coefficients. A relative signal determination element is configured to calculate at least one relative signal parameter representing the two closely spaced targets as a function of the azimuth difference, the azimuth mean, and the set of polynomial coefficients.

BRIEF DESCRIPTION OF THE DRAWINGS

FIG. 6 illustrates a relative signal extractor in accordance with an aspect of the present invention.

DETAILED DESCRIPTION OF INVENTION

The invention described herein relates to the efficient processing of signals from a monopulse system to provide relative signal parameters for two closely spaced targets. It will be appreciated that monopole techniques can be implemented with radar systems, sonar systems, and similar sensing arrangements, and a monopulse processor in accordance with an aspect of the present invention can be utilized to extract relative signals from data provided by any system using a monopulse sensing arrangement. In the interest of clarity, terminology consistent with a radar implementation will be utilized throughout this description of the invention and the exemplary implementations herein, as well as in the accompanying claims, to the extent appropriate. For example, the term "antenna" will be used to describe the instrument sending the initial pulse and receiving the monopulse response channels, although it will be appreciated that a sonar arrangement would utilize one or more transducers for this function. Similarly, references to the "radar cross section" and "antenna boresight angle" should be understood to be used generically to encompass analogous concepts in sonar applications.

Figure 1:
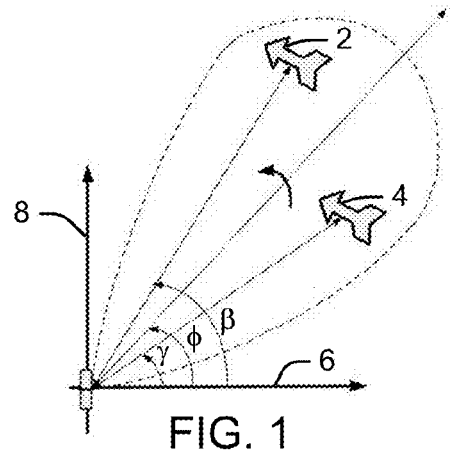
FIG. 1 illustrates a geometry of a monopulse antenna scanning two closely spaced targets.

FIG. 1 illustrates the geometry of a monopulse antenna scanning two closely spaced targets: a first target 2, and a second target 4. The first target 2 is located at a first azimuth angle, β. The second target 4 is located at second azimuth angle, γ. The two targets are scanned by the main beam of a monopulse antenna, with the direction of antenna main beam determined by a variable boresight angle φ. The first azimuth angle, the second azimuth angle, and boresight angle are measured from an arbitrary horizontal axis 6. The horizontal axis 6 is perpendicular to a vertical axis 8 joining the centers of the two antenna elements (channels).

Figure 2:
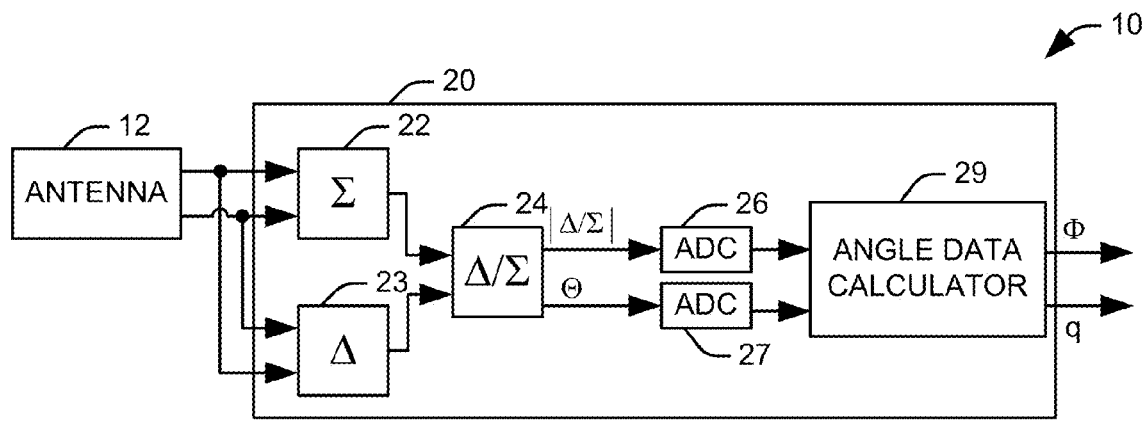
FIG. 2 illustrates an exemplary monopulse system that could be utilized with a monopulse processor in accordance with an aspect of the present invention.

FIG. 2 illustrates an exemplary monopulse scanning arrangement 10 that can be utilized with a relative signal extraction element in accordance with an aspect of the present invention. In the standard monopulse scanning arrangement, within a given scan from an antenna 12 an antenna beam is split into two or more parts and sent out as a plurality of signals emanating from the antenna in slightly different directions. When the reflected signals are received they are amplified separately and compared to each other, indicating the direction of the target relative to the boresight. Since this comparison is carried out during one pulse, which is typically a few microseconds, changes in target position or heading will have no effect on the comparison. The antenna elements, representing the antenna channels, are placed within an azimuth plane for transmission and reception of the monopulse signal. It will be appreciated that the vertical angle of the targets can be measured similarly with two antenna elements placed within a vertical plane, or both the vertical and azimuth planes can be represented in a four channel antenna. The concepts discussed herein in the monopulse processing systems of FIGS. 3, 4, 5, and 6 can be applied in a straightforward manner by one of skill in the art to determine either the azimuth angle, the vertical angle, or both, but for the sake of brevity, the discussion below will center on determination of the azimuth angles of closely spaced targets.

In the illustrated arrangement 10, the return signals from the plurality of signals are received at the antenna 12 as two return channels. The standard monopulse scanner calculates a monopulse ratio by normalizing the difference, Δ, between responses of the two channels over the sum, Σ, of those responses. Accordingly, a sum of the two return signals is determined at a summer 22, and a difference between the two return signals can be determined at a difference component 23. The monopulse ratio is then calculated at a divider 24 to produce a magnitude, $|\Delta/\Sigma|$, and a phase, Θ, of the monopulse ratio. The magnitude and phase can be quantized at respective analog-to-digital converters (ADCs) 26 and 27. The digitized signal can then be provided to an angle data calculator 29 that calculates real and imaginary parts of monopulse ratio, and hence the merged azimuth Φ and the quadrature q angles. Filtering can be applied to either the calculated azimuth and quadrature angle values or the calculated amplitude of the monopulse ratio to reduce signal noise and mitigate the noise introduced by quantization.

For two closely spaced targets, the merged azimuth and the quadrature angles have the following mathematical formulations:

$$\Phi = \kappa \text{Re}\left(\frac{\Delta}{\Sigma}\right) + \phi = \frac{\beta + (\beta + \gamma)\chi\cos\psi + \gamma\chi^2}{1 + \chi^2 + 2\chi\cos\psi} \quad \text{Eq. 1}$$

$$q = \kappa \text{Im}\left(\frac{\Delta}{\Sigma}\right) = -\frac{\alpha_d \chi \sin\psi}{1 + \chi^2 + 2\chi\cos\psi} \quad \text{Eq. 2}$$

where κ is the antenna slope, which can be equated to unity without loss of generality, β and γ are the targets' azimuth angles, ψ is the phase difference between the targets' signals at the antenna, and χ is the ratio between magnitudes of targets' signals at the antenna. The ratio of the target signal magnitudes, χ, can be represented as:

$$\chi = \sqrt{R}\exp(2\zeta\{\alpha_m - \phi\}\alpha_d) \quad \text{Eq. 3}$$

where R is the radar cross section ratio of the two targets, $\alpha_m$ ($\alpha_m = 0.5(\beta+\gamma)$) is the mean of the two azimuth angles, $\alpha_d$ ($\alpha_d = \beta-\gamma$) is difference between the two azimuth angles, and ζ is a constant related to the antenna three decibel beam width $\theta_0$, such that:

$$\zeta = 1.3864\left(\frac{1}{\theta_0}\right)^2 \quad \text{Eq. 4}$$

Figure 3:
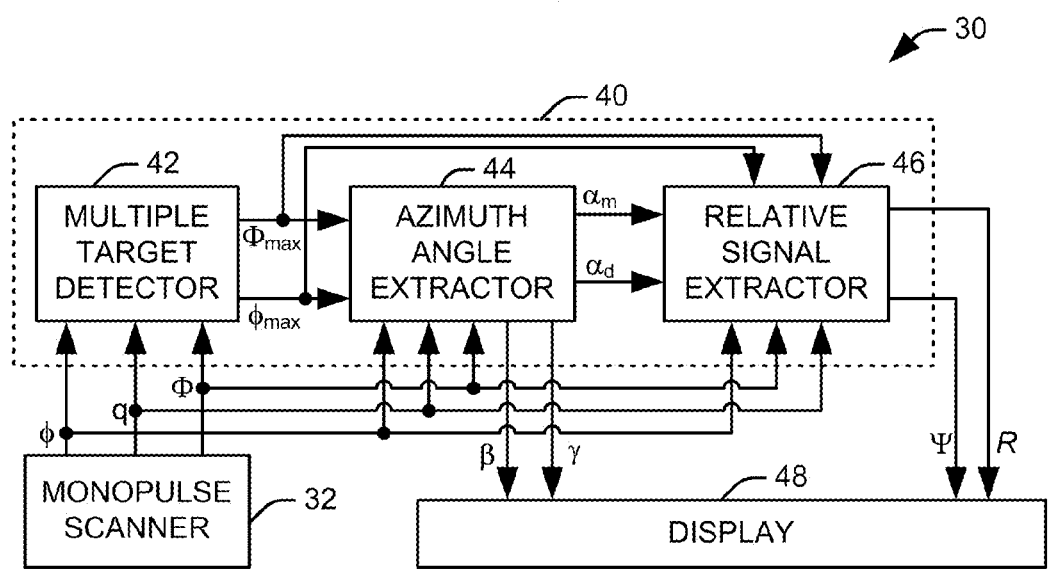
FIG. 3 illustrates a monopulse processor system in accordance with an aspect of the present invention.

FIG. 3 illustrates a monopulse system 30 incorporating a relative signal extractor in accordance with an aspect of the present invention. The monopulse system 30 includes a monopulse scanner 32 and a monopulse processor 40 that utilizes the monopulse scan data from the monopulse scanner to determine one or more properties of the scanned target and the return signals representing the targets. The monopulse processor 40 includes a multiple target detector 42 that receives values of merged azimuth angle data, Φ, and quadrature angle data, q, and determines a number of targets represented by the monopulse scan data. In one example, the multiple target detector 42 calculates a mean, $\mu_\Phi$, and variance, $\sigma_\Phi$, of the merged azimuth angle data and it compares the variance against a predetermined azimuth angle threshold $\sigma_{th}$. The detector confirms the presence of one target within the antenna scan if the variance is below the threshold. Otherwise, the detector searches for maximum magnitudes, $q_{max}$, of the quadrature angle data and the corresponding antenna boresight angles, $\phi_{max}$. The multiple target detector 42 reports the presence of three targets or more if two maxima or more are found for the magnitude of quadrature angle within the antenna scan. Otherwise, the multiple target detector 42 declares the presence of two targets within the antenna scan. In this case the detector delivers merged azimuth angle data, $\Phi$, and quadrature angle data, q, along with the maximum magnitude of quadrature angle, $q_{max}$, and the corresponding antenna boresight angle $\phi_{max}$, if they exist, to the azimuth angle extractor 44.

The azimuth angle extractor 44 applies one of two models in extracting the targets' azimuth angles, depending on maximum magnitude of quadrature angle $q_{max}$. If $q_{max}$ exceeds a quadrature angle threshold, $q_0$, the azimuth angle extractor applies a quadrature angle algorithm that constructs and solves a quadratic algebraic equation for the targets' azimuth angles. The equation coefficients are obtained through integrating quadrature angle data within an angular region of the antenna scan. If $q_{max} \leq q_0$, the azimuth angle-extractor applies a merged azimuth angle algorithm that fits azimuth angle data to either a cubic or a linear polynomial and uses the polynomials' coefficients in extracting targets' azimuth angles, $\beta$ and $\gamma$, which are provided to an associated display 48. A mean of the target azimuth angles, $\alpha_m$, and a difference between the target azimuth angles, $\alpha_d$, are provided to a relative signal extractor 46

Once the azimuth angles have been determined, the relative signal extractor 46 extracts relative signals of the two targets. The relative signals are characterized by their amplitude and phase. The amplitude, which is usually described by the radar cross section ratio, R, of the targets, indicates how strong the return from one target relative to the return from the other target. If the return is strong enough a track is initiated for the target, and otherwise the target is dropped out. The phase aspect of the relative signals is represented by difference, $\Psi$, between phases of the targets' signals at the monopulse antenna. Such a phase difference indicates how far the targets are from each other within the antenna scan. The relative signal extractor 46 fits the azimuth angle data to either a linear model or a cubic model to determine each of the radar cross section ratio of the signals and the phase difference between the signals, and provides this information to a user at the display 48.

Figure 4:
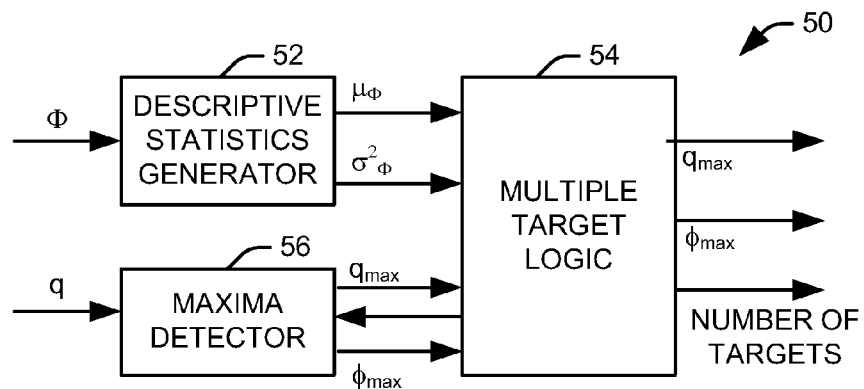
FIG. 4 illustrates an exemplary implementation of a multiple target detector in accordance with an aspect of the present invention.

FIG. 4 illustrates an exemplary multiple target detector 50 that can be utilized in a monopulse processor with a relative signal extractor in accordance with an aspect of the present invention. The multiple target detector 50 determines the number of targets represented within a region of a monopulse scan by calculating the variance of the merged azimuth angle data and determining a number of local maxima in the magnitude of quadrature angle data, and comparing each to an appropriate threshold. To this end, a descriptive statistic generator 52 receives merged azimuth angle from a monopulse scanner and calculates a mean, $\mu_\Phi$, and a variance, $\sigma^2_\Phi$. It will be appreciated that the azimuth data from the monopulse scanner is referred to as the "merged" data due to the possibility that it may represent multiple targets. The mean and variance of the merged azimuth angle are provided to a multiple target logic component 54 that compares the computed variance to a threshold variance, $\sigma^2_{th}$. The threshold value can, for example, be determined empirically for a given system as a maximum variance in the azimuth angle data observed when presented with single targets, or an appropriate value can be estimated from the properties of the monopulse scanner. If the calculated variance falls below the threshold variance, it is determined that the data represents a single target, and the mean of the azimuth angle data is output as the azimuth angle for the target.

If the calculated variance exceeds the threshold variance, the quadrature angle data from the monopulse scanner is analyzed at a maxima detector 56. The maxima detector 56 determines the location and number of local maxima within the magnitude of quadrature angle data. Any appropriate optimization methodology for locating the maxima of a numerical data set may be utilized, such as a gradient search or similar algorithm, can be used to locate the maxima. The multiple target logic 54 then determines if the number of located maxima is greater than one. If so, it is determined that three or more targets are present. Otherwise, it is determined that two targets are present in the monopulse scan, and the azimuth angle data, the quadrature angle data, the maximum value of the quadrature angle, $q_{max}$, if any, and the corresponding boresight angle, $\phi_{max}$, are output from the multiple target detector 50.

Figure 5:
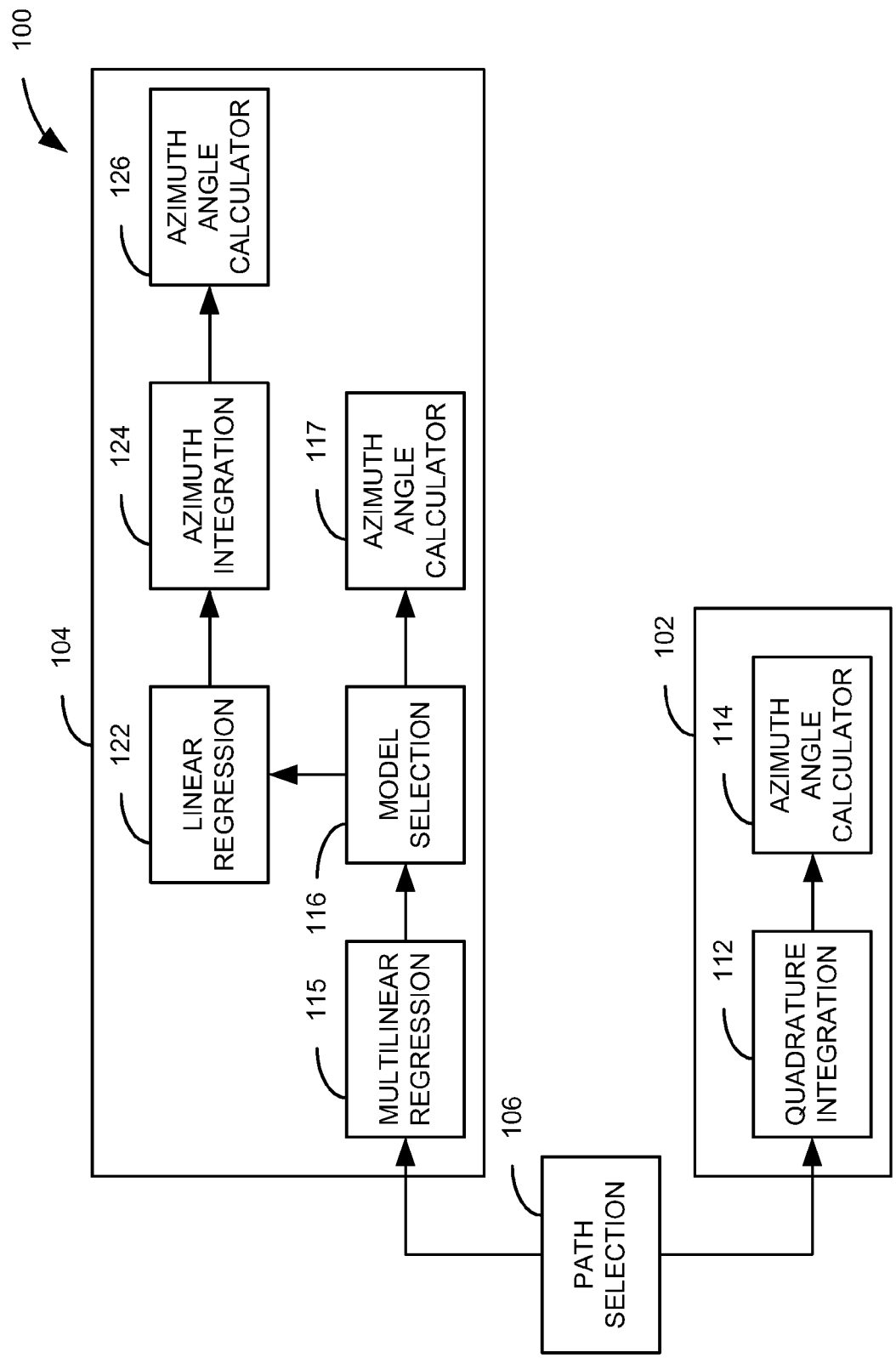
FIG. 5 illustrates an exemplary azimuth angle extractor in accordance with an aspect of the present invention.

FIG. 5 illustrates an exemplary azimuth angle extractor 100 that could be utilized in a monopulse processor with a relative signal extractor in accordance with an aspect of the present invention. The azimuth angle extractor 100 determines respective azimuth angles for two closely spaced targets in a monopulse scan. The illustrated azimuth angle extractor 100 receives data from other portions of a monopulse system, including a set of merged azimuth angle data, [$\Phi$], a set of quadrature angle data, [q], a maximum value for the magnitude of quadrature angle, $q_{max}$, and an antenna boresight angle, $\phi_{max}$, corresponding to the maximum quadrature angle, and uses one of two elements, a quadrature angle element 102 and a merged azimuth angle element 104, to calculate target azimuth angles, $\beta$ and $\gamma$, for the two closely spaced targets. In accordance with an aspect of the present invention, the quadrature angle element 102 is used when determined values of the quadrature angle, that is the imaginary part of the monopulse ratio, are higher than noise level, and merged azimuth angle element 104 is used when determined values of the quadrature angle data are lower than noise level. To this end, the azimuth angle extractor 100 comprises a path selection element 106 that compares the maximum quadrature angle to a threshold value, $q_0$, representing a noise level of the monopulse return signal. If the maximum quadrature angle value exceeds the threshold value, the quadrature angle element 102 is selected and utilized to determine the azimuth angles for the two targets. If the maximum quadrature angle value fails to exceed the threshold value, the merged azimuth angle element 104 is selected and utilized to determine the targets' azimuth angles. In one implementation, a quadrature angle threshold value of 0.17 was used.

The quadrature angle element 102 includes a quadrature integration component 112 that integrates quadrature angle data over an angular region within the monopulse scan. In performing the integration, the quadrature integration element 112 starts by selecting the angular integration region, from a first boresight angle, $\phi_1$, to a second boresight angle, $\phi_2$. The first and second boresight angles are selected as to define a region that excludes the boresight angle, $\phi_{max}$, associated with maximum magnitude of quadrature angle data. After selecting the integration region, the quadrature integration element 112 integrates the quadrature angle data to provide an integrated quadrature value, F, determined as:

$$F = 2\zeta \int_{\phi_1}^{\phi_2} q\, d\phi \qquad \text{Eq. 5}$$

Once the quadrature angle data is integrated, the integration output is used along with values for the quadrature angle data ($q_1, q_2$) and merged azimuth angle data ($\Phi_1, \Phi_2$) at the integration limits to estimate mean $\alpha_m$ and difference $\alpha_d$ of targets' azimuth angles at a first azimuth angle calculator 114. The mean of the targets' azimuth angles can be calculated as:

$$\alpha_m = \frac{1}{2}[(\Phi_1 + \Phi_2) + (q_2 - q_1)/\tan F] \qquad \text{Eq. 6}$$

The difference between the targets' azimuth angles can be calculated as:

$$\alpha_d = 2\sqrt{\alpha_m^2 - C} \qquad \text{Eq. 7}$$

where $C = q_2 q_1 + \Phi_1\Phi_2 + (q_2\Phi_1 - q_1\Phi_2)/\tan F$

In accordance with an aspect of the present invention, the formulas for the estimated mean, $\alpha_m$, and difference, $\alpha_d$, are derived from the two solutions of a quadratic algebraic equation, $\beta^2 - 2\alpha_m\beta + C = 0$. Once the mean and difference of the targets' azimuth angles has been determined, the first azimuth angle calculator 114 can determine the azimuth angle values, $\beta$ and $\gamma$, of the two targets as:

$$\beta = \alpha_m + \alpha_d/2 \qquad \text{Eq. 8}$$

$$\gamma = \alpha_m - \alpha_d/2 \qquad \text{Eq. 9}$$

The merged azimuth angle element, 104 fits merged azimuth angle data, [$\Phi$], to a cubic polynomial function of the corresponding antenna boresight angles, $\phi$, to acquire a set of polynomial coefficients at a multilinear regression element 115. Specifically, the azimuth angle data can be fitted to a cubic polynomial via a multilinear regression process to find the polynomial coefficients, $a_1$, $a_2$, $a_3$, and $a_4$ in the following model:

$$\Phi = a_1\phi^3 + a_2\phi^2 + a_3\phi + a_4 \qquad \text{Eq. 10}$$

Once the polynomial coefficients have been determined, a model selection component 116 determines whether the cubic polynomial model is suitable for representing the azimuth angle data. To this end, the magnitude of the coefficient of the cubic term of the polynomial is compared to a threshold value to determine if the cubic model accurately represents the trend of the merged azimuth angle data. In one implementation, the threshold value is equal to 0.005. If the magnitude of the coefficient of the cubic term exceeds the threshold, the mean and difference of the targets' azimuth angle values can be determined at a second azimuth angle calculator 117 from the determined set of polynomial coefficients as:

$$\alpha_m = a_4 + a_3\phi_{max} + a_2\phi_{max}^2 + a_1\phi_{max}^3 \qquad \text{Eq. 11}$$

$$\alpha_d = \sqrt{2m/\zeta} \text{ where} \qquad \text{Eq. 12}$$

$$\phi_{max} = -\frac{a2}{3a_3}, m = a_2\phi_{max} + a_3,$$

and $\phi_{max}$ is the value of the boresight angle associated with the maximum magnitude of the quadrature angle $q_{max}$. This boresight angle may fall outside the monopulse scan under consideration.

From the determined mean and difference of the azimuth angles, the azimuth angles, $\beta$ and $\gamma$, can be determined by the second azimuth angle calculator 117 as shown above in Eqs. 8 and 9.

If the magnitude of the coefficient of the cubic term fails to exceed the threshold, the cubic model does not accurately capture the trend of the merged azimuth data and a linear model is utilized. At a linear regression component 122, the merged azimuth angle data is fitted to a linear function ($\Phi = a_1\phi + a_2$) of the antenna boresight angle to determine a first order coefficient, $a_1$, and an intercept value, $a_2$.

In addition to the coefficient values, an integration term, w, of the merged azimuth angle data can be determined at an azimuth integration component 124. In performing the integration, the azimuth integration component 124 starts by selecting the angular integration region, bounded by a first boresight angle, $\phi_1$, and a second boresight angle, $\phi_2$. After selecting the integration region, the azimuth integration component 124 integrates the azimuth angle data to provide an integrated value, w, determined as:

$$w = \frac{1}{\Delta\phi}\int_{\phi_1}^{\phi_2} \Phi\, d\phi \qquad \text{Eq. 13}$$

where $\Delta\phi = \phi_2 - \phi_1$.

From the polynomial coefficients and performing the integration of the merged azimuth angle data, a third azimuth angle calculation component 126 estimates a difference, $\alpha_d$, between the targets' azimuth angles and a mean, $\alpha_m$, of the targets' azimuth angles as:

$$\alpha_d = \sqrt{\frac{2a_1}{\zeta}} \qquad \text{Eq. 14}$$

$$\alpha_m = \alpha_0 + \frac{\zeta\alpha_d}{2a_1}(\alpha_0 - a_2)^2 - \frac{\zeta\alpha_d}{2}(\alpha_0 - a_2)(\phi_1 + \phi_2) \qquad \text{Eq. 15}$$

where $$\alpha_0 = \frac{1}{2}\left[w + a_2 + a_1\left\{\frac{1}{2}(\phi_1 + \phi_2) + \frac{\zeta\alpha_d}{3}(\phi_1^2 + \phi_1\phi_2 + \phi_2^2)\right\}\right]$$

From the determined mean and difference of the azimuth angles, the azimuth angles, $\beta$ and $\gamma$, can be determined by the third azimuth angle calculation component 126 as shown above in Equations 8 and 9.

FIG. 6 illustrates a relative signal extractor 130 in accordance with an aspect of the present invention. The relative signal extractor 130 receives data from other portions of a monopulse system, including a set of merged azimuth angle data, [$\Phi$], each merged azimuth angle value in the set having an associated antenna boresight angle, a set of quadrature angle data [q], each quadrature angle value in the set having an associated antenna boresight angle, a maximum value for the quadrature angle, $q_{max}$, and a determined mean, $\alpha_m$, and difference, $\alpha_d$, of the target azimuth angles, $\beta$ and $\gamma$, and uses one of two models, a linear polynomial model 132 and a cubic polynomial model 134, to extract relative signals, specifically a phase difference, $\psi$, between the returned signals representing the two closely spaced targets and a radar cross section ratio, R, of the targets. In accordance with an aspect of the present invention, the linear polynomial model 132 is used when determined values of the magnitude of quadrature angle, that is the imaginary part of the monopulse ratio, are higher than noise level, and the cubic polynomial model 134 is used when determined values of the quadrature angle data are lower than noise level. To this end, the relative signal extractor 130 comprises a model selection element 136 that compares the maximum quadrature angle to a threshold value, $q_{th}$, representing a noise level of the monopulse return signal. If the maximum quadrature angle value exceeds the threshold value, the linear polynomial model 132 is selected and utilized to provide a phase difference and the radar cross section ratio for the two targets. If the maximum quadrature angle value fails to exceed the threshold value, the cubic polynomial model 134 is selected and utilized to provide a phase difference and the radar cross section ratio for the two targets. In one implementation, a quadrature angle threshold value of 0.17 was used.

The linear polynomial model 132 fits a modified ratio of merged azimuth angle data, which is represented by the real part of monopulse ratio, and quadrature angle data to an exponential parameter, x. The exponential parameter is calculated from the monopulse scan data at a exponential parameter calculator 142 as a function of the boresight angle, $\phi$, such that:

$$x = \begin{cases} e^{(-2\zeta|\alpha_d||\alpha_m - \phi|)} & \beta < \gamma \\ e^{(2\zeta|\alpha_d||\alpha_m - \phi|)} & \beta > \gamma \end{cases} \quad \text{Eq. 16}$$

For each boresight angle value in the monopulse scan, a modified ratio, z, can be created at a modified ratio calculator 144 from the azimuth angle data and the quadrature angle data. In the illustrated implementation, the modified ratio comprises the ratio of a deviation of the merged azimuth angle data associated with the boresight angle from an azimuth angle of one of the targets and the quadrature angle value associated with the boresight angle, as follows:

$$z = \left[\frac{\Phi - \beta}{q}\right] \quad \text{Eq. 17}$$

The values for the modified ratio z can be fitted to a linear function of the exponential parameters via linear regression to provide a first order coefficient value $b_1$ and a constant $b_2$ at a linear regression component 146.

$$z = b_1 x + b_2 \quad \text{Eq. 18}$$

From these values, it is possible to calculate values for the phase difference, $\psi$, and the radar cross section R at a relative signal determination component 148 as:

$$\psi = \arctan\left[\frac{1}{b_2}\right] \quad \text{Eq. 19}$$

$$R = [b_1 \sin(\psi)]^2 \quad \text{Eq. 20}$$

It will be appreciated that the values provided by the application of the arctangent in the calculation of the phase difference are ambiguous, in that multiple angle values over a three hundred sixty degree cycle can share the same tangent. In accordance with an aspect of the present invention, the signs of the linear polynomial coefficient values, $b_1$ and $b_2$, can be used to determine an appropriate angular range for the phase value. If $b_1$ is positive, the phase difference is less than one hundred eighty degrees, and if $b_1$ is negative, the phase difference is greater than one hundred eighty degrees. The sign of $b_2$ can be used to further narrow the possible range. Specifically, if $b_2$ is positive, the phase difference falls within a first half of the one hundred eighty degree range defined by the sign of $b_1$ (e.g., between zero and ninety degrees if $b_1$ is positive and between one hundred eighty and two hundred and seventy degrees if $b_2$ is negative). If $b_2$ is negative, the phase difference falls within a second half of the one hundred eighty degree range defined by the sign of $b_1$ (e.g., between ninety and one hundred eighty degrees if $b_1$ is positive and between two hundred seventy and three hundred sixty degrees if $b_2$ is negative). This is summarized in Table 1 below:

TABLE 1

| Sign of $b_1$ | Sign of $b_2$ | Range of phase difference $\psi$ |
| --- | --- | --- |
| + | + | $0° < \psi < 90°$ |
| + | − | $90° < \psi < 180°$ |
| − | + | $180° < \psi < 270°$ |
| − | − | $270° < \psi < 360°$ |

Equations 19-20 are derived through solving the following identities:

$$b_1 = \frac{\sqrt{R}}{\sin\psi} \quad \text{Eq. 21}$$

$$b_2 = \frac{\cos\psi}{\sin\psi} \quad \text{Eq. 22}$$

To get Equation 21 and Equation 22, Equation 1 is rewritten as:

$$\Phi - \beta = -\frac{\alpha_d \chi(\chi + \cos\psi)}{1 + \chi^2 + 2\chi\cos\psi} \quad \text{Eq. 23}$$

Dividing Equation 23 over Equation 2, and using Equation 3, yields:

$$\frac{\Phi - \beta}{q} = \frac{\sqrt{R} x + \cos\psi}{\sin\psi} \quad \text{Eq. 24}$$

Comparing Equation 24 to Equation 18 gives Equations 21 and 22.

The cubic polynomial model 134 fits merged azimuth angle data, [Φ], to a cubic polynomial function of the corresponding antenna boresight angles, $\phi$, to acquire a set of polynomial coefficients at a multilinear regression element 152. From these polynomial coefficients, it is possible to determine a mean, $\alpha_m$, and a difference, $\alpha_d$, of the azimuth angle values, β and γ, for the targets. Specifically, the azimuth angle data can be fitted to the cubic polynomial via a multilinear regression process to find the polynomial coefficients, $a_1$, $a_2$, $a_3$, and $a_4$ in the following model:

$$\Phi = a_1\phi^3 a_2\phi^2 + a_3\phi + a_4 \quad \text{Eq. 25}$$

For example, N antenna boresight angles ($\phi_1, \phi_2, \ldots, \phi_N$) surrounding a central boresight angle $\phi_0$ can be selected. It will be appreciated that the central boresight angle, $\phi_0$, may be including as one of the N angles. The cubic polynomial of Eq. 25 can be used to construct a matrix equation relating the boresight angles $\phi_i$'s (i=1, ..., N) and the corresponding merged azimuth angles $\Phi_i$'s (i=1, ..., N), such that:

$$\vec{\Phi} = \bar{\bar{\phi}} \vec{a} \qquad \text{Eq. 26}$$

where $$\vec{a} = \begin{bmatrix} a_4 \\ a_3 \\ a_2 \\ a_1 \end{bmatrix} \vec{\Phi} = \frac{1}{N} \begin{bmatrix} \sum_{j=1}^{N} \Phi_j \\ \sum_{j=1}^{N} \Phi_j \phi_j \\ \sum_{j=1}^{N} \Phi_j \phi_j^2 \\ \sum_{j=1}^{N} \Phi_j \phi_j^3 \end{bmatrix},$$

and $$\bar{\bar{\phi}} = \frac{1}{N} \begin{bmatrix} N & \sum_{j=1}^{N} \phi_j & \sum_{j=1}^{N} \phi_j^2 & \sum_{j=1}^{N} \phi_j^3 \\ \sum_{j=1}^{N} \phi_j & \sum_{j=1}^{N} \phi_j^2 & \sum_{j=1}^{N} \phi_j^3 & \sum_{j=1}^{N} \phi_j^4 \\ \sum_{j=1}^{N} \phi_j^2 & \sum_{j=1}^{N} \phi_j^3 & \sum_{j=1}^{N} \phi_j^4 & \sum_{j=1}^{N} \phi_j^5 \\ \sum_{j=1}^{N} \phi_j^3 & \sum_{j=1}^{N} \phi_j^4 & \sum_{j=1}^{N} \phi_j^5 & \sum_{j=1}^{N} \phi_j^6 \end{bmatrix}.$$

Solving for the vector $\vec{a}$ obtains:

$$\vec{a} = \bar{\bar{\phi}}^{-1} \vec{\Phi} \qquad \text{Eq. 27}$$

where $\bar{\bar{\phi}}^{-1}$ is the inverse of the matrix $\bar{\bar{\phi}}$.

One of skill in the art will appreciate that a number of methods exist for finding the inverse of a matrix, and any of these methods can be utilized in determining values for the elements of the vector $\vec{a}$. In one implementation, to facilitate the determination of the inverse, the matrix $\bar{\bar{\phi}}$ can be portioned into submatrices with lower dimensions, such that:

$$\bar{\bar{\phi}} = \begin{bmatrix} \bar{\bar{\phi}}_{11} & \bar{\bar{\phi}}_{12} \\ \bar{\bar{\phi}}_{21} & \bar{\bar{\phi}}_{22} \end{bmatrix} \qquad \text{Eq. 28}$$

where each of $\bar{\bar{\phi}}_{11}$, $\bar{\bar{\phi}}_{12}$, $\bar{\bar{\phi}}_{21}$, and $\bar{\bar{\phi}}_{22}$ is a 2×2 matrix.

Finding an inverse of these 2×2 matrices is relatively straightforward, and the inverse, $\bar{\bar{\phi}}^{-1}$, can be determined as products of the submatricies and their inverses, such that:

$$\bar{\bar{\phi}}^{-1} = \begin{bmatrix} \bar{\bar{F}}_{11} & \bar{\bar{F}}_{12} \\ \bar{\bar{F}}_{21} & \bar{\bar{F}}_{22} \end{bmatrix} \qquad \text{Eq. 29}$$

where $$\bar{\bar{F}}_{11} = [\bar{\bar{\phi}}_{11} - \bar{\bar{\phi}}_{12} \bar{\bar{\phi}}_{22}^{-1} \bar{\bar{\phi}}_{21}]^{-1},$$

$$\bar{\bar{F}}_{22} = [\bar{\bar{\phi}}_{22} - \bar{\bar{\phi}}_{21} \bar{\bar{\phi}}_{11}^{-1} \bar{\bar{\phi}}_{12}]^{-1},$$

$$\bar{\bar{F}}_{12} = -\bar{\bar{\phi}}_{11}^{-1} \bar{\bar{\phi}}_{12} \bar{\bar{F}}_{22},$$

and $$\bar{\bar{F}}_{21} = -\bar{\bar{\phi}}_{22}^{-1} \bar{\bar{\phi}}_{21} \bar{\bar{F}}_{11}$$

It will be appreciated that calculating the coefficients via linear regression techniques in each of the linear polynomial model 132 and the cubic polynomial model 134 has the benefit of reducing effects of noise and phase quantization within the analysis, making the calculation of the relative signals for two closely spaced targets via a monopulse processor in accordance with an aspect of the present invention more efficient and accurate than known methods.

Once the polynomial coefficients have been determined, values for the mean, $\alpha_m$, and difference, $\alpha_d$, of the azimuth angle values, $\beta$ and $\gamma$, for the targets can be determined from the calculated polynomial values at an azimuth angle calculator 154. While estimates for these values can be provided from an associated azimuth angle extractor, it has been found that estimates of these values by means other than that described hereinafter tend to be inaccurate when the quadrature angle values are below the noise level in the data, resulting in an underestimate of the radar cross section ratio of the two targets. Accordingly, in the cubic polynomial model, the mean of the two azimuth values is determined as:

$$\alpha_m = -w + a_4 + a_3 \phi_0 + a_2 \phi_0^2 + a_1 \phi_0^3 \text{ where} \qquad \text{Eq. 30}$$

$$w = \frac{\phi_0 a_2 + a_3 - m}{2 \zeta m \phi_0};$$

$$m = a_3 + 2 a_2 \phi_0 + 3 a_1 \phi_0^2; \qquad \text{Eq. 31}$$

and $\phi_o$ is the central boresight angle.

Specifically, the difference between the two azimuth values can be determined as:

$$\alpha_d = (1 + \chi_0) \sqrt{m/(2 \zeta \chi_0)} \qquad \text{Eq. 32}$$

where $\chi_0$ is the magnitude of the targets' signal ratio at the central boresight angle, equal to $$\chi_0 = \begin{cases} 1 + 4w^2 \zeta / m - \sqrt{(1 + 4w^2 \zeta / m)^2 + 1}, & w > 0 \\ 1 + 4w^2 \zeta / m + \sqrt{(1 + 4w^2 \zeta / m)^2 + 1}, & w < 0 \end{cases} \qquad \text{Eq. 33}$$

From the determined mean and difference and the magnitude of the targets' signal ratio at the central boresight angle, the radar cross section ratio, R, of the two targets can be calculated at a relative signal determination element 156 as:

$$R = \begin{cases} \chi_0^2 e^{(-4 \zeta \alpha_d (\alpha_m - \phi_0))}, & \beta > \gamma \\ \dfrac{1}{\chi_0^2} e^{(4 \zeta \alpha_d (\alpha_m - \phi_0))}, & \beta < \gamma \end{cases} \qquad \text{Eq. 34}$$

The phase difference, $\psi$, of the two targets can be calculated at the relative signal determination element 156 as:

$$\psi \approx \begin{cases} \arctan\left[-\frac{q_0(1+\chi_0)^2}{(\chi_0\alpha_d)}\right], & \beta > \gamma \\ \arctan\left[\frac{q_0(1+\chi_0)^2}{(\chi_0\alpha_d)}\right], & \beta < \gamma \end{cases} \qquad \text{Eq. 35}$$

where $q_0$ is the value of the quadrature angle at the central boresight angle.

In getting Equations 30 and 31, Taylor's series expansion is used to represent the merged azimuth angle around the boresight angle $\phi_0$ with keeping only the first four terms in the expansion yielding:

$$\Phi \approx \Phi_0 + \Phi_0'(\phi - \phi_0) + \frac{1}{2!}\Phi_0''(\phi - \phi_0)^2 + \frac{1}{3!}\Phi_0'''(\phi - \phi_0)^3 \qquad \text{Eq. 36}$$

$\Phi_0$ is the merged azimuth angles at the boresight angle $\phi_0$, $\Phi_0'$, $\Phi_0''$, and $\Phi_0'''$ are the first, the second, and the third order derivatives of merged azimuth angle with respect to the antenna boresight $\phi$ at the boresight angle $\phi_0$ with:

$$\Phi_0 = \alpha_m + w; \qquad \text{Eq. 37}$$

$$w = \frac{0.5\alpha_d(1-\chi_0^2)}{1+\chi_0^2+2\chi_0\cos\psi}; \qquad \text{Eq. 38}$$

$$\Phi_0' = \frac{2\zeta\alpha_d^2\chi_0(2\chi_0 + \chi_0^2\cos\psi + \cos\psi)}{(1+\chi_0^2+2\chi_0\cos\psi)^2} = m; \qquad \text{Eq. 39}$$

$$\Phi'' = -4\zeta wm(1+\eta); \qquad \text{Eq. 40}$$

$$\eta = \frac{2\chi_0\sin^2\psi}{2\chi_0 + (1+\chi_0^2)\cos\psi}; \qquad \text{Eq. 41}$$

$$\Phi''' = 4\zeta m[m(w^2-1)(1+\eta) - w\eta']; \qquad \text{Eq. 42}$$
and $$\eta' = \frac{-2\zeta\alpha_d\eta\cos\psi(1-\chi_0^2)}{2\chi_0 + (1+\chi_0^2)\cos\psi} \qquad \text{Eq. 43}$$

Introducing Equations 37-43 into Equation 36 and comparing the resultant against Equation 25 yields the formulations of the polynomial coefficients $a_1$, $a_2$, $a_3$, and $a_4$:

$$a_1 = 2\nu/3; \qquad \text{Eq. 44}$$

$$a_2 = -2\zeta mw(1+\eta) - 2\nu\phi_0; \qquad \text{Eq. 45}$$

$$a_3 = m + 4\zeta mw(1+\eta)\phi_0 + 2\nu\phi_0^2; \qquad \text{Eq. 46}$$

$$a_4 = \alpha_m + w - m\phi_0 - 2\zeta mw(1+\eta)\phi_0^2 - 2\nu\phi_0^3/3; \text{ and} \qquad \text{Eq. 47}$$

$$\nu = \zeta m\{m(w^2-1)(1+\eta) - w\eta'\} \qquad \text{Eq. 48}$$

Imposing the restriction of lower values of phase difference ($|\Psi| \ll 1$) yields the following:

$$\eta \approx \eta' \approx 0 \qquad \text{Eq. 49}$$

$$\nu = \zeta m^2(w^2 - 1) \qquad \text{Eq. 50}$$

$$w = \frac{\alpha_d(1-\chi_0)}{2(1+\chi_0)} \qquad \text{Eq. 51}$$

$$m = \frac{2\zeta\alpha_d^2\chi_0}{(1+\chi_0)^2} \qquad \text{Eq. 52}$$

Multiplying Equation 44 by $\phi_0^3$, Equation 45 by $\phi_0^2$, and Equation 46 by $\phi_0$, and adding the resultants to Equation 47 gives the mathematical formulation for mean of targets' azimuth angles reported in Equation 30. Furthermore, multiplying Equation 45 by $2\phi_0$, and Equation 44 by $3\phi_0^2$, and adding the resultants to Equation 46 yields m, as reported in Equation 31. In addition, multiplying Equation 44 by $\phi_0$, adding the resultant to Equation 46, and using Equation 49 yields w of Equation 51.

To get the ratio magnitude $\chi_0$, Equation 51 is squared and the resultant is divided over Equation 52 to obtain the following quadratic algebraic equation:

$$\chi_0^2 - 2(1 + 4\zeta w^2/m)\chi_0 + 1 = 0 \qquad \text{Eq. 53}$$

Solving Equation 53 gives the formulation of ratio magnitude $\chi_0$ given in Equation 43.

The phase difference formulation is obtained by setting $\cos\Psi \approx 1$ to yield:

$$\tan\Psi \approx \sin\Psi \qquad \text{Eq. 54}$$

Regardless of which model 132 and 134 is used, the relative signal extractor 130 provides an accurate estimate of the phase difference between the returned signals representing the two closely spaced targets and the radar cross section ratio, R between the targets.

Figure 7:
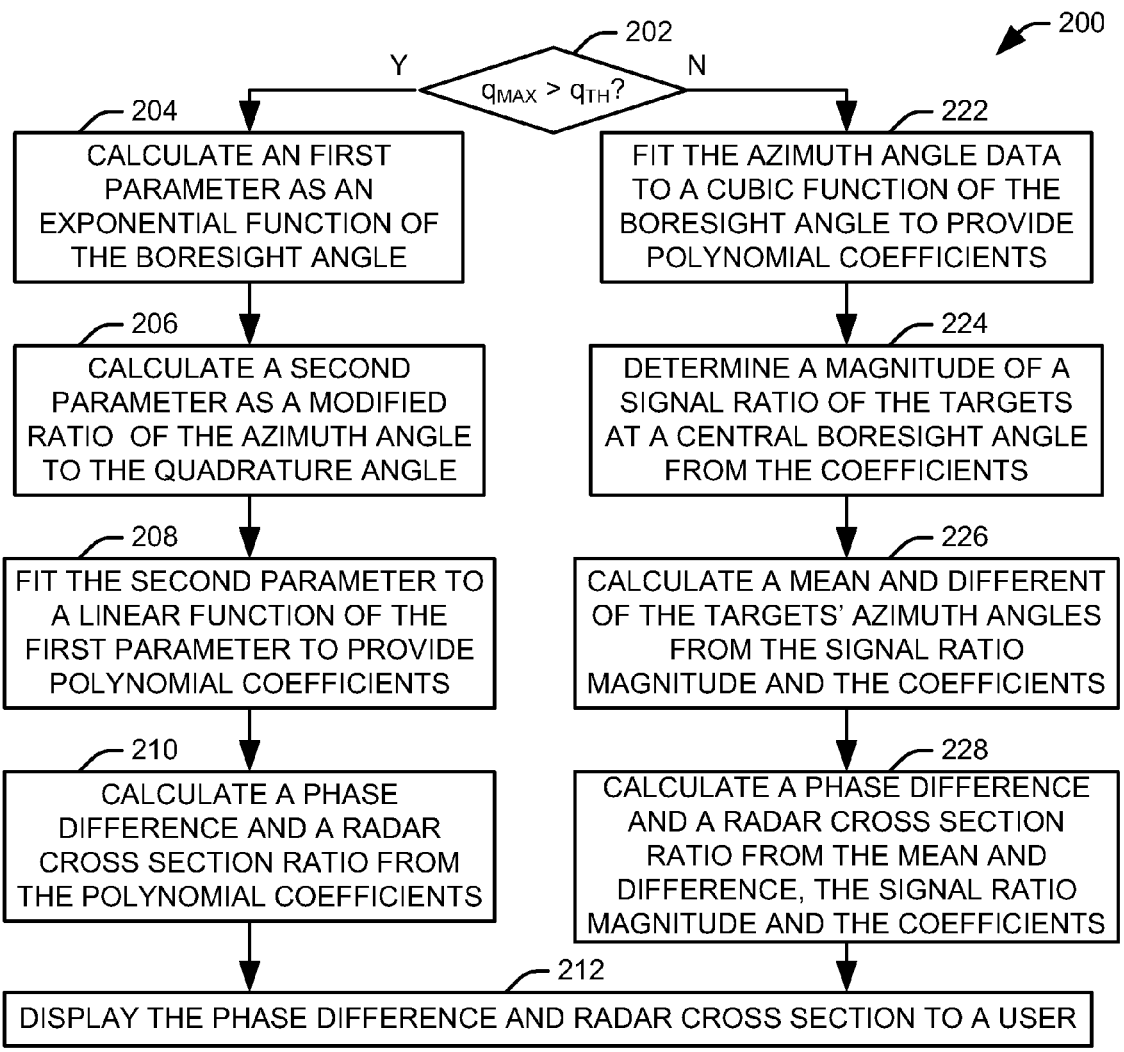
FIG. 7 illustrates an exemplary methodology for processing data from a monopulse system representing two closely spaced targets to extract a phase difference between the returned signals representing the two closely spaced targets and the radar cross section ratio between the targets.

In view of the foregoing structural and functional features described above, methodologies in accordance with various aspects of the present invention will be better appreciated with reference to FIG. 7. While, for the purpose of simplicity of explanation, the methodologies of FIG. 7 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 7 illustrates an exemplary methodology 200 for processing data from a monopulse system representing two closely spaced targets to extract a phase difference between the returned signals representing the two closely spaced targets and the radar cross section ratio of the targets. The methodology 200 begins at 202, where a maximum value, $q_{max}$, for a set of quadrature angle data from the monopulse scan is compared to a threshold value, $q_{th}$, representing a noise level of the monopulse data. If the maximum quadrature angle value exceeds a quadrature angle threshold (Y), the methodology proceeds to 204, where a first parameter is calculated for each of a plurality of scan data points as an exponential function of the antenna boresight angle for that data point, the mean of the azimuth angles for the two targets, the difference between the azimuth angles for the two targets, and the three decibel beam width of the antenna. At 206, a second parameter is calculated for each scan data point, as the ratio of the difference between the merged azimuth angle value for the data point and the estimate azimuth angle for one target to the quadrature angle for that data point. At 208, the first parameter is fitted to a linear polynomial function of the second parameter via a linear regression analysis to provide first order and a zeroth order polynomial coefficient values. At 210, the phase difference and the radar cross section ratio between the two targets are calculated from the determined polynomial coefficients. The calculated phase difference and radar cross section ratio are displayed to a user at 212.

If, at 202, it is determined that the maximum quadrature angle value does not exceed a quadrature angle threshold (N), the methodology proceeds to 222, where the merged azimuth angle data for a plurality of scan data points is fitted to a cubic polynomial function of the boresight angles for the plurality of scan data points via a multilinear regression analysis to provide a set of polynomial coefficients. At 224, a magnitude of the targets' signal ratio at a central boresight angle is determined from the set of polynomial coefficients. At 226, a mean of the azimuth angle values for the two targets and a difference between the azimuth angle values for the two targets is determined from the set of polynomial coefficients and the determined magnitude of the targets' signal ratio at the central boresight angle. At 228, the phase difference and the radar cross section ratio between the two targets are calculated from the mean of the azimuth values for the two targets, the difference between the two azimuth angle values, and the determined magnitude of the targets' signal ratio at the central boresight angle. The methodology then proceeds to 212, where the calculated phase difference and radar cross section ratio are displayed to a user.

Figure 8:
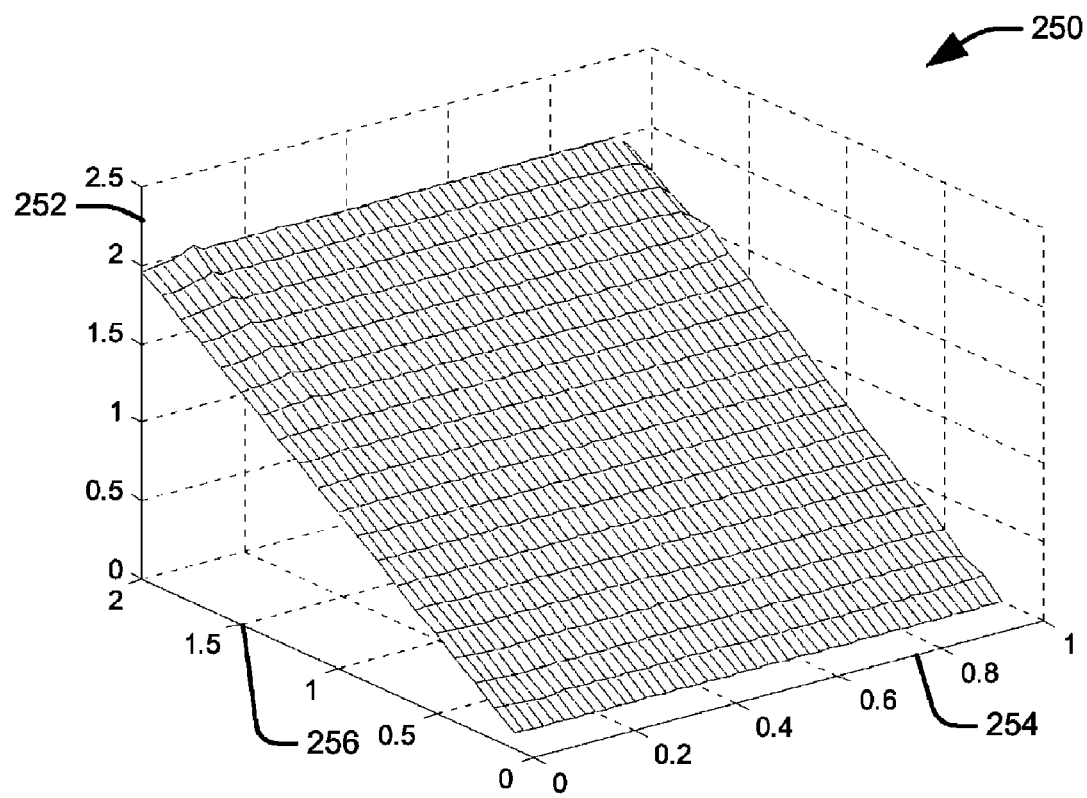
FIG. 8 illustrates a predicted radar cross section ratio for two targets separated by a quarter antenna beam width with 8-bit phase quantization as a function of phase difference between targets' signals and as a function of radar cross section ratio (first azimuth angle=6°, second azimuth angle=5°, antenna beam width=4°).

FIG. 8 is a chart 250 illustrating a predicted radar cross section ratio of two closely spaced targets, represented on a first axis 252, as a function of a phase difference between targets' signals, represented on a second axis 254, and as a function of the radar cross section ratio of the two targets, represented on a third axis 256. In the illustrated chart, the two closely spaced targets are separated by a quarter antenna beam width. The values of radar cross section ratio are obtained from simulated data generated for a monopulse antenna having a three decibel beam width of four degrees. A first target has a first azimuth angle of six degrees, and a second target has a second azimuth angle of five degrees. The antenna is set to scan an azimuth angle range between four and eight degrees. Then by using Equations 1 and 2, varying the phase difference within the range of 0-180 degrees (0-π radian), and varying the radar cross section R within the range of 0.1-2, the simulated data is generated. Upon generating the simulated data, it is applied into a monopulse processing system in accordance with the present invention to retrieve values of radar cross section ratio.

Figure 9:
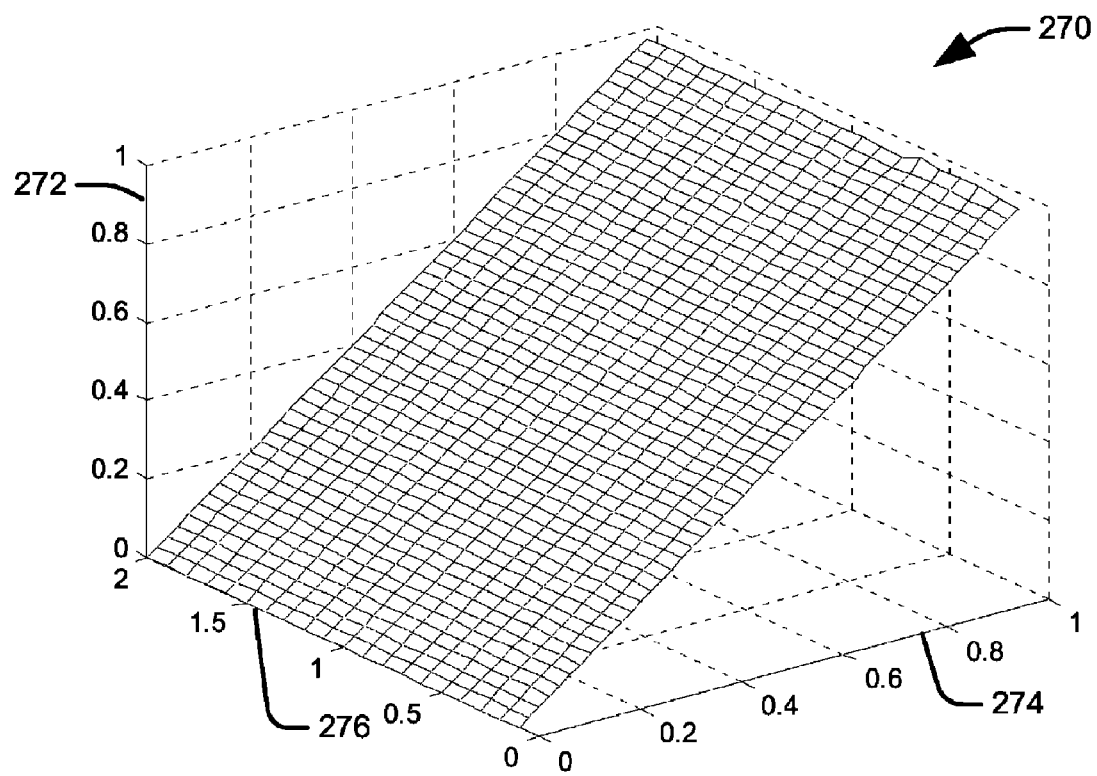
FIG. 9 illustrates a predicted phase difference of two targets separated by a quarter antenna beam width as a function of difference between the phases of targets' signals and as a function of radar cross section ration (first azimuth angle=6°, second azimuth angle=5°, antenna beam width=4°).

FIG. 9 is a chart 270 illustrating a phase difference between the signals of two closely spaced targets, represented on a first axis 272, as a function of a phase difference between targets' signals, represented on a second axis 274, and as a function of the radar cross section ratio of the two targets, represented on a third axis 276. In the illustrated chart, the two closely spaced targets are separated by a quarter antenna beam width. The values of phase difference are obtained from simulated data generated for a monopulse antenna having a three decibel beam width of four degrees. A first target has a first azimuth angle of six degrees, and a second target has a second azimuth angle of five degrees. The antenna is set to scan an azimuth angle range between four and eight degrees. Then by using Equations 1 and 2, varying the phase difference within the range of 0-180 degrees (0-π radian), and varying the radar cross section R within the range of 0.1-2, the simulated data is generated. Upon generating the simulated data, it is applied into a monopulse processing system in accordance with the present invention to retrieve values of the phase difference.

Figure 10:
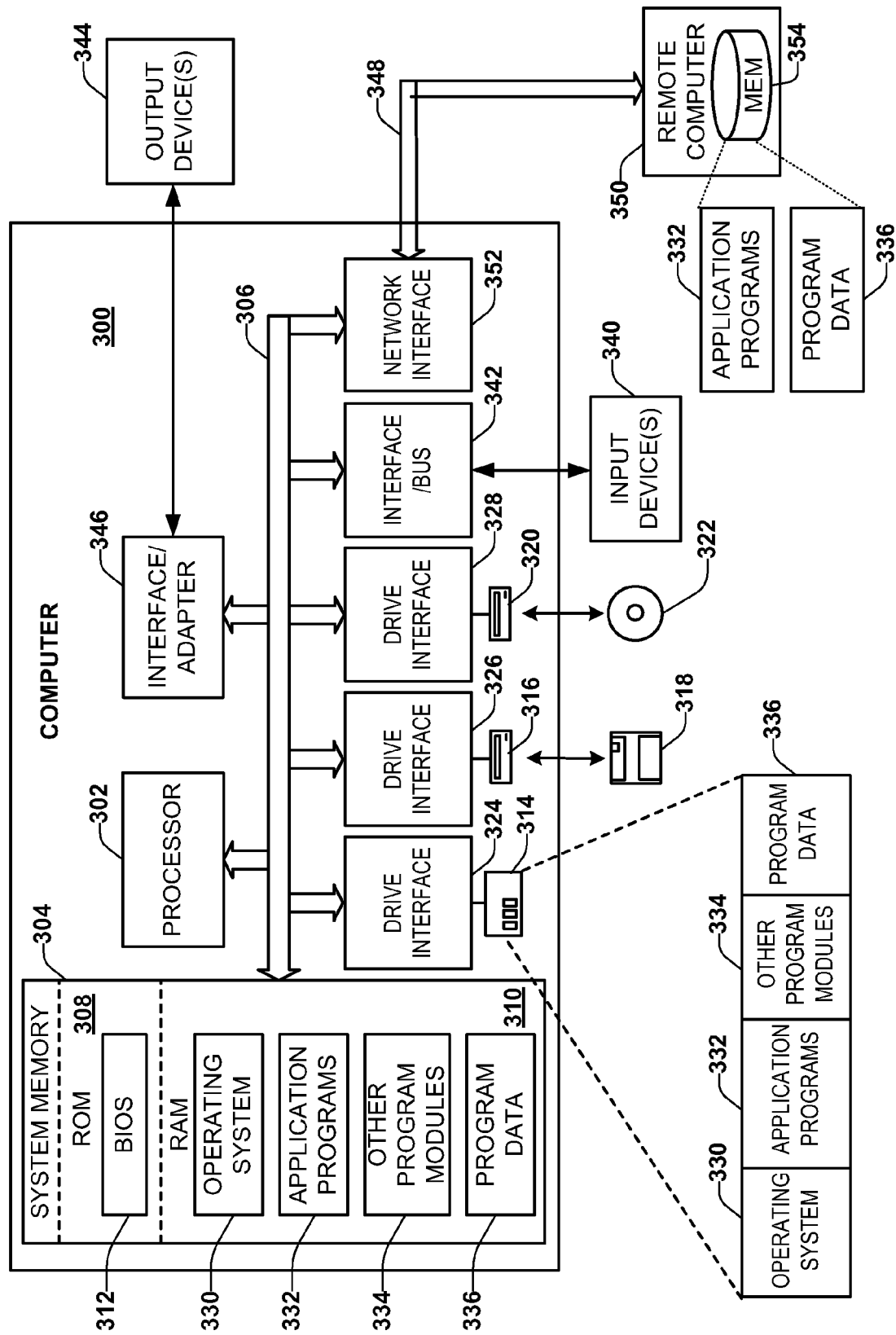
FIG. 10 illustrates a computer system that can be employed to implement systems and methods described herein, such as based on computer executable instructions running on the computer system.

FIG. 10 illustrates a computer system 300 that can be employed to implement systems and methods described herein, such as based on computer executable instructions running on the computer system. The computer system 300 can be implemented on one or more general purpose networked computer systems, embedded computer systems, routers, switches, server devices, client devices, various intermediate devices/nodes and/or stand alone computer systems. Additionally, the computer system 300 can be implemented as part of the computer-aided engineering (CAE) tool running computer executable instructions to perform a method as described herein.

The computer system 300 includes a processor 302 and a system memory 304. A system bus 306 couples various system components, including the system memory 304 to the processor 302. Dual microprocessors and other multi-processor architectures can also be utilized as the processor 302. The system bus 306 can be implemented as any of several types of bus structures, including a memory bus or memory controller, a peripheral bus, and a local bus using any of a variety of bus architectures. The system memory 304 includes read only memory (ROM) 308 and random access memory (RAM) 310. A basic input/output system (BIOS) 312 can reside in the ROM 308, generally containing the basic routines that help to transfer information between elements within the computer system 300, such as a reset or power-up.

The computer system 300 can include a hard disk drive 314, a magnetic disk drive 316, e.g., to read from or write to a removable disk 318, and an optical disk drive 320, e.g., for reading a CD-ROM or DVD disk 322 or to read from or write to other optical media. The hard disk drive 314, magnetic disk drive 316, and optical disk drive 320 are connected to the system bus 306 by a hard disk drive interface 324, a magnetic disk drive interface 326, and an optical drive interface 334, respectively. The drives and their associated computer-readable media provide nonvolatile storage of data, data structures, and computer-executable instructions for the computer system 300. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like.

A number of program modules may also be stored in one or more of the drives as well as in the RAM 310, including an operating system 330, one or more application programs 332, other program modules 334, and program data 336.

A user may enter commands and information into the computer system 300 through user input device 340, such as a keyboard, a pointing device (e.g., a mouse). Other input devices may include a microphone, a joystick, a game pad, a scanner, a touch screen, or the like. These and other input devices are often connected to the processor 302 through a corresponding interface or bus 342 that is coupled to the system bus 306. Such input devices can alternatively be connected to the system bus 306 by other interfaces, such as a parallel port, a serial port or a universal serial bus (USB). One or more output device(s) 344, such as a visual display device or printer, can also be connected to the system bus 306 via an interface or adapter 346.

The computer system 300 may operate in a networked environment using logical connections 348 to one or more remote computers 350. The remote computer 348 may be a workstation, a computer system, a router, a peer device or other common network node, and typically includes many or all of the elements described relative to the computer system 300. The logical connections 348 can include a local area network (LAN) and a wide area network (WAN).

When used in a LAN networking environment, the computer system 300 can be connected to a local network through a network interface 352. When used in a WAN networking environment, the computer system 300 can include a modem (not shown), or can be connected to a communications server via a LAN. In a networked environment, application programs 332 and program data 336 depicted relative to the computer system 300, or portions thereof, may be stored in memory 354 of the remote computer 350.

A combination of components or methodologies for the present invention could be used within the monopulse radar of UPX-39 identification system built by Northrop Grumman Navigation Systems Division (NSD). What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A method for extracting at least one relative signal parameter representing two closely spaced targets from monopulse scan data, comprising a quadrature angle value and a merged azimuth angle value for each plurality of boresight angles, from a monopulse scanner comprising:
   comparing, at a monopulse processor, a maximum quadrature angle value from the quadrature angle values associated with the plurality of boresight angles with a threshold quadrature value representing a noise level of the monopulse scan data stored in a memory;
   extracting, at the monopulse processor the at least one relative signal parameter according to a cubic polynomial model that is configured to fit the merged azimuth angle values to a cubic function of their corresponding boresight angles to produce a set of polynomial coefficients and determine the at least one relative signal parameter from the set of polynomial coefficients if the maximum quadrature angle fails to exceed the threshold quadrature value; and
   extracting, at the monopulse processor, the at least one relative signal parameter according to a linear polynomial model that is configured to fit a function of the merged azimuth angle data stored in the memory associated with each boresight angle and the quadrature angle value associated with the boresight angle to a linear function of an exponential parameter that is an exponential function of the boresight angle to produce a first order coefficient and a constant value and determine the at least one relative signal parameter from the first order coefficient and the constant value if the maximum quadrature angle exceeds the threshold quadrature value
   wherein the monopulse processor comprises a processing unit for accessing the memory and executing computer executable instructions stored in the memory.

2. The method of claim 1, wherein extracting the at least one relative signal parameter according to a cubic polynomial model comprises:
   fitting the merged azimuth angle values to a cubic function of their corresponding boresight angles to produce the set of polynomial coefficients;
   determining an azimuth difference as a difference between a first azimuth angle value for a first target and a second azimuth angle value for a second target and an azimuth mean as a mean of the first azimuth angle value and a second azimuth angle value from the set of polynomial coefficients; and
   calculating at least one relative signal parameter representing the two closely spaced targets as a function of the azimuth difference, the azimuth mean, and the set of polynomial coefficients.

3. The method of claim 1, wherein extracting the at least one relative signal parameter according to a linear polynomial model comprises:
   calculating, for each antenna boresight angle, the exponential parameter as an exponential function of the boresight angle;
   computing, for each boresight angle, a modified ratio value as a function of the merged azimuth angle data associated with the boresight angle and the quadrature angle value associated with the boresight angle;
   fitting the modified ratio values for the plurality of boresight angles to a linear function of the exponential parameters for the plurality of boresight angles via a linear regression analysis to provide the first order coefficient value and the constant value; and
   calculating at least one relative signal parameter representing the two closely spaced targets as a function of the first order coefficient value and the constant value.

4. The method of claim 1, the at least one relative signal parameter comprising a phase difference between respective signals representing the two closely spaced targets and a radar cross section of the targets.

5. The method of claim 1, further comprising displaying a representation of the at least one relative signal parameter at an associated display.

6. A system for extracting at least one relative signal parameter representing two closely spaced targets from monopulse scan data, comprising a quadrature angle value and a merged azimuth angle value for each plurality of boresight angles, from a monopulse scanner comprising:
   an exponential parameter generator configured to calculate, for each antenna boresight angle, an exponential parameter that is an exponential function of the boresight angle;
   a modified ratio generator configured to compute, for each boresight angle, a modified ratio value as a function of the merged azimuth angle data associated with the boresight angle and the quadrature angle value associated with the boresight angle;
   a linear regression component configured to fit the modified ratio values for the plurality of boresight angles to a linear function of the exponential parameters for the plurality of boresight angles via a linear regression analysis to provide a first order coefficient value and a constant value; and
   a relative signal determination component configured to calculate at least one relative signal parameter representing the two closely spaced targets as a function of the first order coefficient value and the constant value.

7. The system of claim 6, the exponential parameter generator being receiving a difference between the azimuth angles of the closely spaced targets and a mean of the azimuth angles of the closely spaced targets and calculating, for each boresight angle, an exponential parameter that is an exponential function of the boresight angle.

8. The system of claim 6, the modified ratio generator being configured to compute, for each boresight angle, a modified ratio value as a ratio of a deviation of the merged azimuth angle data associated with the boresight angle from an azimuth angle of one of the targets and the quadrature angle value associated with the boresight angle.

9. The system of claim 6, the relative signal determination component being configured to determine a phase difference between respective signals representing the two targets as the arctangent of the inverse of the constant value produced by the linear regression component.

10. The system of claim 9, the relative signal determination component being configured to select one of a plurality of angular ranges for the determined phase difference according to the signs of the first order coefficient value and the constant value produced by the linear regression component.

11. The system of claim 9, the relative signal determination component being configured to determine a radar cross section ratio between the two closely spaced targets as the square of the product of the first order coefficient and a sine of the phase difference.

12. The system of claim 6, further comprising a model selection element that is configured to compare a maximum quadrature angle value from the quadrature angle values associated with the plurality of boresight angles to a threshold value representing a noise level of the monopulse scan data, each of the exponential parameter generator, the modified ratio generator, the linear regression component, and the relative signal determination component operating to calculate at least one relative signal parameter only if the maximum quadrature angle value exceeds the threshold value.

13. The system of claim 12, further comprising a cubic polynomial model that is configured to fit the merged azimuth angle values to a cubic function of their corresponding boresight angles to provide a set of polynomial coefficients and determine the at least one relative signal parameter from the set of polynomial coefficients, the model selection component selecting the cubic polynomial model if the maximum quadrature angle value fails to exceed the threshold value.

14. A system for extracting at least one relative signal parameter representing two closely spaced targets from monopulse scan data, comprising a quadrature angle value and a merged azimuth angle value for each plurality of boresight angles, from a monopulse scanner comprising:
 a multilinear regression element configured to fit the merged azimuth angle values to a cubic function of their corresponding boresight angles to produce a set of polynomial coefficients;
 an azimuth angle calculator configured to determine an azimuth difference as a difference between a first azimuth angle value for a first target and a second azimuth angle value for a second target and an azimuth mean as a mean of the first azimuth angle value and a second azimuth angle value from the set of polynomial coefficients; and
 a relative signal determination element configured to calculate at least one relative signal parameter representing the two closely spaced targets as a function of the azimuth difference, the azimuth mean, and the set of polynomial coefficients.

15. The system of claim 14, the azimuth angle calculator being configured to calculate the azimuth mean as a cubic function of a central boresight angle in which each coefficient in the cubic function of the central boresight angle is a function of at least one of the set of polynomial coefficients.

16. The system of claim 14, the azimuth angle calculator being configured to calculate a magnitude of a signal ratio of the closely spaced targets at the central boresight angle as a function of the set of polynomial coefficients and calculate the azimuth difference as a function of the magnitude of the signal ratio of the closely spaced targets at the central boresight angle.

17. The system of claim 16, the relative signal determination element being configured to determine a radar cross section ratio between the two closely spaced targets as a function of the magnitude of the signal ratio of the closely spaced targets at the central boresight angle, the central boresight angle, the azimuth mean, and the azimuth difference.

18. The system of claim 16, the relative signal determination element being configured to determine a phase difference between respective signals representing the two closely spaced targets as a function of the azimuth difference, the magnitude of the signal ratio of the closely spaced targets at the central boresight angle, and a quadrature angle value associated with the central boresight angle.

19. The system of claim 14, further comprising a model selection element that is configured to compare a maximum quadrature angle value from the quadrature angle values associated with the plurality of boresight angles to a threshold value representing a noise level of the monopulse scan data, each of the multilinear regression element, the azimuth angle calculator, and the relative signal determination element operating to calculate at least one relative signal parameter only if the maximum quadrature angle value fails to exceed the threshold value.

20. The system of claim 19, further comprising a linear polynomial model that is configured to fit a function of the merged azimuth angle data associated with each boresight angle and the quadrature angle value associated with the boresight angle to a linear function of an exponential parameter that is an exponential function of the boresight angle to produce a first order coefficient and a constant value and determine the at least one relative signal parameter from the first order coefficient and the constant value, the model selection component selecting the linear polynomial model if the maximum quadrature angle value fails to exceed the threshold value.

* * * * *